United States Patent
Kato

(10) Patent No.: US 10,308,074 B2
(45) Date of Patent: Jun. 4, 2019

(54) PNEUMATIC TIRE

(71) Applicant: BRIDGESTONE CORPORATION, Chuo-ku, Tokyo (JP)

(72) Inventor: Keiichi Kato, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 242 days.

(21) Appl. No.: 15/116,884

(22) PCT Filed: Dec. 25, 2014

(86) PCT No.: PCT/JP2014/006471
§ 371 (c)(1),
(2) Date: Aug. 5, 2016

(87) PCT Pub. No.: WO2015/136590
PCT Pub. Date: Sep. 17, 2015

(65) Prior Publication Data
US 2017/0203614 A1  Jul. 20, 2017

(30) Foreign Application Priority Data

Mar. 11, 2014  (JP) ................. 2014-047850

(51) Int. Cl.
*B60C 11/04* (2006.01)
*B60C 11/03* (2006.01)
*B60C 11/12* (2006.01)

(52) U.S. Cl.
CPC ........ *B60C 11/0302* (2013.01); *B60C 11/032* (2013.01); *B60C 11/0304* (2013.01);
(Continued)

(58) Field of Classification Search
CPC ............... B60C 11/0304; B60C 11/032; B60C 2011/0381
See application file for complete search history.

(56) References Cited

FOREIGN PATENT DOCUMENTS

| CN | 105283326 A | 1/2016 |
|---|---|---|
| JP | H0616106 U | 3/1994 |

(Continued)

OTHER PUBLICATIONS

English machine translation of JP2010-269776. (Year: 2010).*
English machine translation of JP2010-260403. (Year: 2010).*

*Primary Examiner* — Robert C Dye
(74) *Attorney, Agent, or Firm* — Kenja IP Law PC

(57) ABSTRACT

A pneumatic tire includes: two external circumferential main grooves in a vehicle-installed outside half portion; two internal circumferential main grooves in a vehicle-installed inside half portion; a central land portion; an external intermediate land portion; and an internal intermediate land portion. The central land portion is a rib-shaped land portion continuous in the tire circumferential direction. The external intermediate land portion includes external resonators each composed of a first auxiliary groove, a first branch groove, and a second branch groove. The internal intermediate land portion includes internal resonators each composed of a second auxiliary groove, a third branch groove, and a fourth branch groove. The first auxiliary groove is less in groove volume than the second auxiliary groove. A total groove width of the two external circumferential main grooves is less than a total groove width of the two internal circumferential main grooves.

13 Claims, 2 Drawing Sheets

(52) U.S. Cl.
CPC ............ *B60C 11/04* (2013.01); *B60C 11/042* (2013.01); *B60C 11/12* (2013.01); *B60C 2011/0348* (2013.01); *B60C 2011/0381* (2013.01); *B60C 2011/0388* (2013.01); *B60C 2011/1209* (2013.01)

(56) References Cited

FOREIGN PATENT DOCUMENTS

| | | | |
|---|---|---|---|
| JP | 2007269144 A | | 10/2007 |
| JP | 2010-260403 | * | 11/2010 |
| JP | 2010260403 A | | 11/2010 |
| JP | 2010-269776 | * | 12/2010 |
| JP | 2010280266 A | | 12/2010 |
| JP | 2011037348 A | | 2/2011 |
| JP | 2011140268 A | | 7/2011 |

* cited by examiner a-a' SECTION b-b' SECTION

PNEUMATIC TIRE

TECHNICAL FIELD

The disclosure relates to a pneumatic tire.

BACKGROUND

Pneumatic tires are required to make less noise during vehicle running to enhance quietness. Various pneumatic tires have been proposed that reduce vehicle exterior noise such as air column resonance sound generated from the circumferential main grooves formed in the tread surface of the tire, by resonators (Helmholtz-type resonators) each composed of an air chamber and a narrowed groove.

For example, Patent Literature (PTL) 1 proposes a pneumatic tire including: a plurality of rib-shaped land portions; and first and second resonators each composed of an air chamber and a narrowed groove, wherein the number of second resonators located in the vehicle-installed inside rib-shaped land portion is greater than the number of first resonators located in the vehicle-installed outside rib-shaped land portion. Such a pneumatic tire can reduce, at high level, both vehicle interior noise such as road noise and vehicle exterior noise such as pass-by noise resulting from air column resonance sound.

CITATION LIST

Patent Literature

PTL 1: JP 2011-37348 A

SUMMARY

Technical Problem

Such a conventional tire can especially reduce air column resonance sound generated on the vehicle-installed inside. Even with this tire, however, an attempt to reduce air column resonance sound more sufficiently involves the following risk: more grooves in the land portions of the tire as a result of the formation of resonators causes a smaller footprint area and lower rigidity, leading to a decrease in steering stability.

It could therefore be helpful to provide a pneumatic tire that achieves, at high level, both a reduction of noise arising from circumferential main grooves and steering stability.

Solution to Problem

A pneumatic tire according to the disclosure includes, in a tread surface: two external circumferential main grooves extending in a tire circumferential direction, in a vehicle-installed outside half portion with respect to a tire equatorial plane; two internal circumferential main grooves extending in the tire circumferential direction, in a vehicle-installed inside half portion with respect to the tire equatorial plane; a central land portion defined by one of the external circumferential main grooves and one of the internal circumferential main grooves that are adjacent to each other with the tire equatorial plane in between; an external intermediate land portion defined by the two external circumferential main grooves; and an internal intermediate land portion defined by the two internal circumferential main grooves, wherein the central land portion is a rib-shaped land portion continuous in the tire circumferential direction, the external intermediate land portion includes external resonators each of which is composed of: a first auxiliary groove terminating within the external intermediate land portion at both ends; a first branch groove less in groove volume than the first auxiliary groove and having respective ends open to the external circumferential main groove closer to the tire equatorial plane and the first auxiliary groove; and a second branch groove less in groove volume than the first auxiliary groove and having respective ends open to the external circumferential main groove on vehicle-installed outside and the first auxiliary groove, the internal intermediate land portion includes internal resonators each of which is composed of: a second auxiliary groove terminating within the internal intermediate land portion at both ends; a third branch groove less in groove volume than the second auxiliary groove and having respective ends open to the internal circumferential main groove closer to the tire equatorial plane and the second auxiliary groove; and a fourth branch groove less in groove volume than the second auxiliary groove and having respective ends open to the internal circumferential main groove on vehicle-installed inside and the second auxiliary groove, the first auxiliary groove is less in groove volume than the second auxiliary groove, and a total groove width of the two external circumferential main grooves is less than a total groove width of the two internal circumferential main grooves.

With such a structure, both a reduction of noise arising from circumferential main grooves and steering stability can be achieved at high level.

In the disclosure, the groove width of each circumferential main groove is the width measured along the direction orthogonal to the extension direction of the circumferential main groove and, in the case where the groove width of the circumferential main groove varies, the average groove width of the circumferential main groove on the tire circumference.

Preferably, at least a part of each of the external resonators in the tire circumferential direction overlaps, in a tire width direction, with an adjacent one of the external resonators in the tire circumferential direction, and at least a part of each of the internal resonators in the tire circumferential direction overlaps, in the tire width direction, with an adjacent one of the internal resonators in the tire circumferential direction.

With such a structure, the rigidity difference in the tire circumferential direction is reduced in each of the external intermediate land portion and the internal intermediate land portion, thus effectively improving uneven wear resistance and steering stability.

Preferably, the number of the external resonators is greater than the number of the internal resonators, and at least a part of the first auxiliary groove in each of the external resonators in the tire circumferential direction overlaps, in a tire width direction, with a first shallow bottom portion of the first auxiliary groove in an adjacent one of the external resonators in the tire circumferential direction, the first shallow bottom portion being less in groove depth than a first deep bottom portion having a largest groove depth in the first auxiliary groove.

With such a structure, air column resonance sound can be further reduced, and also pattern noise can be reduced.

Preferably, a land portion width of each of the external intermediate land portion and the internal intermediate land portion is greater than a land portion width of the central land portion.

With such a structure, the rigidity of each of the external intermediate land portion and the internal intermediate land portion can be ensured to further improve steering stability.

Preferably, in each of the external resonators, the first branch groove and the second branch groove are each open to the first auxiliary groove on one side in the tire circumferential direction, and in each of the internal resonators, the third branch groove and the fourth branch groove are respectively open to the second auxiliary groove on one side and the other side in the tire circumferential direction.

With such a structure, the internal intermediate land portion has block-shaped portions relatively long in the tire circumferential direction, and the external intermediate land portion has block-shaped portions relatively short in the tire circumferential direction. Hence, the possibility of rattling noise occurring when the tire comes into contact with the road surface can be reduced while further improving turning performance and thus steering stability.

Preferably, the second auxiliary groove in each of the internal resonators has a second shallow bottom portion at least in a center part in an extension direction, the second shallow bottom portion being less in groove depth than a second deep bottom portion having a largest groove depth in the second auxiliary groove, and at least a part of the second shallow bottom portion in the tire circumferential direction overlaps, in a tire width direction, with a first deep bottom portion having a largest groove depth in the first auxiliary groove.

With such a structure, the uniformity of the rigidity in the tire width direction can be enhanced to effectively improve steering stability and uneven wear resistance, while maintaining the rigidity of the internal intermediate land portion.

Advantageous Effect

It is thus possible to provide a pneumatic tire that achieves, at high level, both a reduction of noise arising from circumferential main grooves and steering stability.

DETAILED DESCRIPTION

The following describes one of the disclosed embodiments with reference to drawings.

Figure 1:
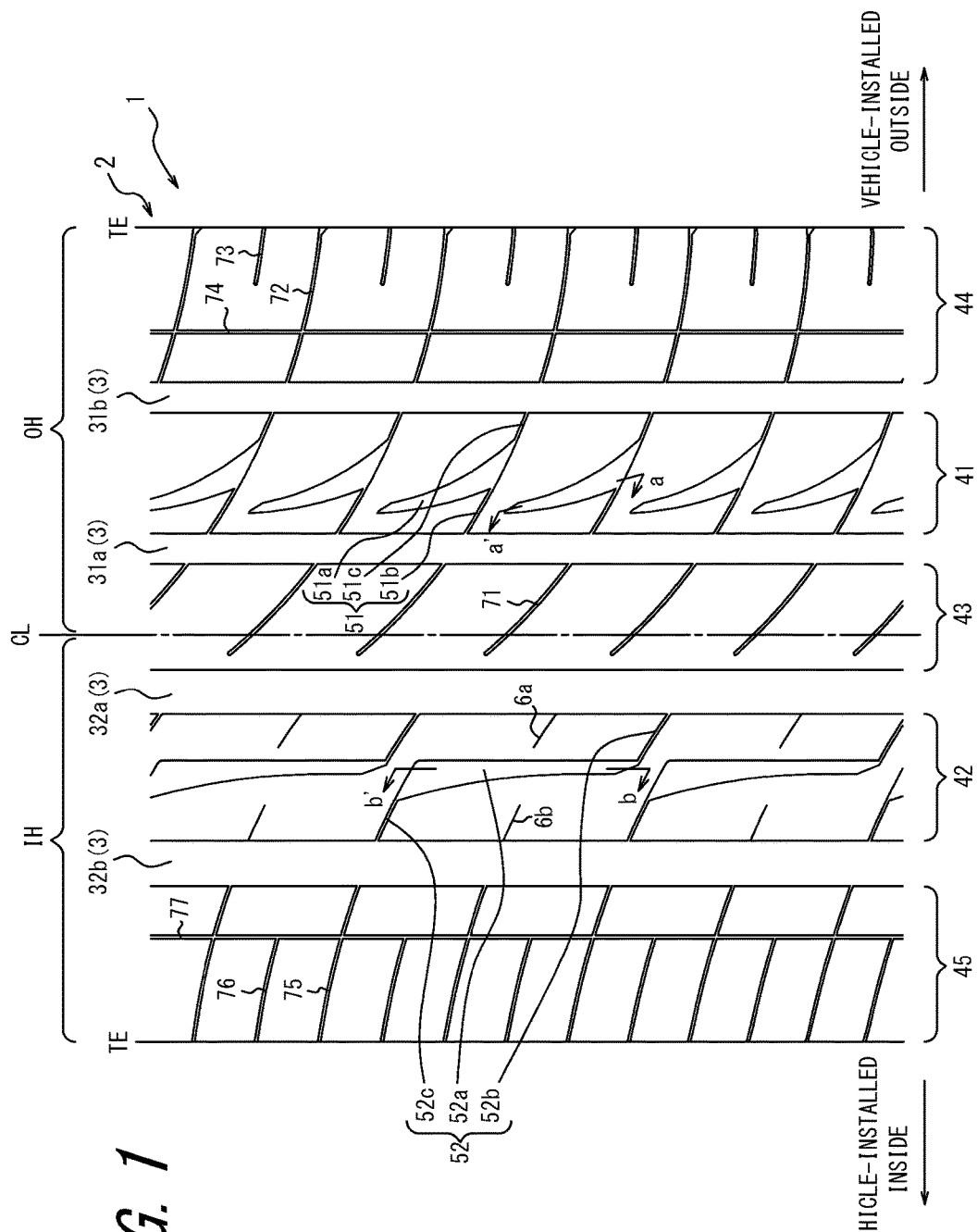
FIG. 1 is a development view illustrating the tread pattern of a pneumatic tire according to one of the disclosed embodiments.

FIG. 1 is a development view illustrating the tread pattern of a pneumatic tire (hereafter also referred to as "tire") 1 according to one of the disclosed embodiments. The tire 1 in this embodiment includes: a carcass having a radial structure toroidally extending between bead portions; a belt located on the tire radial outer side of the carcass in the tread portion; and a tread rubber located on the tire radial outer side of the belt and forming a tread surface 2, although only partially illustrated.

As illustrated in FIG. 1, the tire 1 includes, in its tread surface 2: two external circumferential main grooves 31a and 31b extending in the tire circumferential direction in a vehicle-installed outside half portion OH with respect to a tire equatorial plane CL; and two internal circumferential main grooves 32a and 32b extending in the tire circumferential direction in a vehicle-installed inside half portion IH with respect to the tire equatorial plane CL. Each of the external circumferential main grooves 31a and 31b and the internal circumferential main grooves 32a and 32b continuously extends linearly along the tire circumferential direction. The two external circumferential main grooves 31a and 31b have substantially the same groove width, and the two internal circumferential main grooves 32a and 32b have substantially the same groove width. The total groove width of the external circumferential main grooves 31a and 31b is less than the total groove width of the internal circumferential main grooves 32a and 32b.

Although these circumferential main grooves 3 extend linearly along the tire circumferential direction in FIG. 1, they may extend in a zigzag shape or a wavy shape. The groove width of each of the two external circumferential main grooves 31a and 31b and the groove width of each of the two internal circumferential main grooves 32a and 32b may be changed in any way.

The vehicle-installed inside half portion IH and the vehicle-installed outside half portion OH are the respective half portions on the vehicle outer side and inner side in the tire width direction with respect to the tire equatorial plane CL when the tire 1 is installed to a vehicle.

As illustrated in FIG. 1, the tire 1 includes, in its tread surface 2: a rib-shaped central land portion 43 continuous in the tire circumferential direction in a line, which is defined by the external circumferential main groove 31a and the internal circumferential main groove 32a adjacent to each other with the tire equatorial plane CL in between; an external intermediate land portion 41 in a line defined by the two external circumferential main grooves 31a and 31b; and an internal intermediate land portion 42 in a line defined by the two internal circumferential main grooves 32a and 32b. The land portion width of each of the external intermediate land portion 41 and the internal intermediate land portion 42 is greater than the land portion width of the central land portion 43. Moreover, an external shoulder land portion 44 located outermost in the tire width direction in the vehicle-installed outside half portion OH is defined between the external circumferential main groove 31b outside in the tread width direction from among the external circumferential main grooves 31a and 31b and the corresponding tread ground contact edge TE, and an internal shoulder land portion 45 located outermost in the tire width direction in the vehicle-installed inside half portion IH is defined between the internal circumferential main groove 32b outside in the tread width direction from among the internal circumferential main grooves 32a and 32b and the corresponding tread ground contact edge TE.

A plurality of external resonators 51 and internal resonators 52 (Helmholtz-type resonators in the illustrated example) are arranged respectively in the external intermediate land portion 41 and the internal intermediate land portion 42. In the tire 1, the number of external resonators 51 in the external intermediate land portion 41 is greater than the number of internal resonators 52 in the internal intermediate land portion 42.

The external resonators 51 are each composed of: a first auxiliary groove 51a terminating within the land portion at both ends; a first branch groove 51b having the respective ends open to the external circumferential main groove 31a on the tire equatorial plane CL side and the first auxiliary groove 51a; and a second branch groove 51c having the respective ends open to the external circumferential main groove 31b on the vehicle-installed outside and the first auxiliary groove 51a.

The internal resonators 52 are each composed of: a second auxiliary groove 52a terminating within the land portion at both ends; a third branch groove 52b having the respective ends open to the internal circumferential main groove 32a on the tire equatorial plane CL side and the second auxiliary groove 52a; and a fourth branch groove 52c having the respective ends open to the internal circumferential main groove 32b on the vehicle-installed inside and the second auxiliary groove 52a.

The first branch groove 51b and the second branch groove 51c in the external resonator 51 are each less in groove volume than the first auxiliary groove 51a in the external resonator 51, and the third branch groove 52b and the fourth branch groove 52c in the internal resonator 52 are each less in groove volume than the second auxiliary groove 52a in the internal resonator 52. The first auxiliary groove 51a in the external resonator 51 is less in groove volume than the second auxiliary groove 52a in the internal resonator 52.

Each auxiliary groove has a larger opening area to the tread surface 2 than each of the two branch grooves connected to the auxiliary groove.

In the external resonator 51, the first branch groove 51b and the second branch groove 51c are each open to the first auxiliary groove 51a on one side (the lower side in FIG. 1) in the tire circumferential direction. In the internal resonator 52, the third branch groove 52b and the fourth branch groove 52c are respectively open to the second auxiliary groove 52a on the one side (the lower side in FIG. 1) and the other side (the upper side in FIG. 1) in the tire circumferential direction.

In the illustrated example, in the external resonator 51, the first branch groove 51b is open to a vehicle-installed inside part of the first auxiliary groove 51a on the one side in the tire circumferential direction, and the second branch groove 51c is open to a vehicle-installed outside part (the end) of the first auxiliary groove 51a on the one side in the tire circumferential direction. The first branch groove 51b and the second branch groove 51c extend on the same extension line with a part of the first auxiliary groove 51a on the one side in the tire circumferential direction in between, while inclining with respect to the tire circumferential direction. In the internal resonator 52, the third branch groove 52b is open to the end of the second auxiliary groove 52a on the one side in the tire circumferential direction, and the fourth branch groove 52c is open to the end of the second auxiliary groove 52a on the other side in the tire circumferential direction. The third branch groove 52b and the fourth branch groove 52c extend substantially in the same extension direction.

Instead of the structure in FIG. 1, the third branch groove 52b may be open to the second auxiliary groove 52a on the upper side (one side) in the tire circumferential direction, and the fourth branch groove 52c open to the second auxiliary groove 52a on the lower side (the other side) in the tire circumferential direction.

In the illustrated example, in the external resonator 51, the width of the first auxiliary groove 51a in the tire width direction gradually increases from the end on the one side in the tire circumferential direction for the part on the one side in the tire circumferential direction to which the first branch groove 51b is open, and then gradually decreases toward the end on the other side in the tire circumferential direction. The inclination angle of the extension direction of the centerline of the first auxiliary groove 51a with respect to the tire circumferential direction gradually decreases from the one side to the other side in the tire circumferential direction.

In the internal resonator 52, the width of the second auxiliary groove 52a in the tire width direction gradually increases from the end on the one side in the tire circumferential direction toward the other side in the tire circumferential direction, and then gradually decreases toward the end on the other side in the tire circumferential direction. The inclination angle of the extension direction of the centerline of the second auxiliary groove 52a with respect to the tire circumferential direction gradually increases from the one side to the other side in the tire circumferential direction.

Figure 2A:
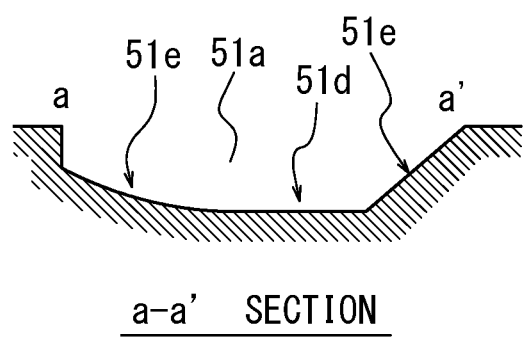
FIG. 2A is a sectional view of the pneumatic tire along line a-a' in FIG. 1.
Figure 2B:
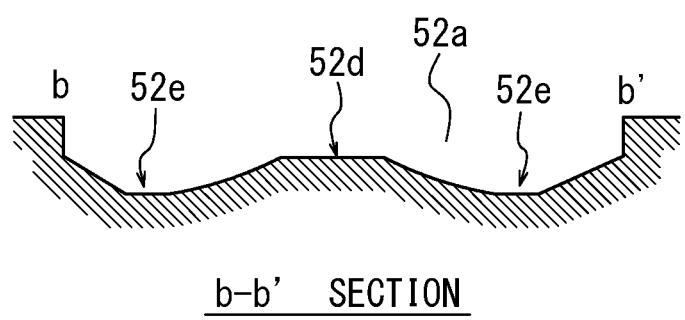
FIG. 2B is a sectional view of the pneumatic tire along line b-b' in FIG. 1.

FIG. 2A is a sectional view of the pneumatic tire 1 along line a-a' in FIG. 1. FIG. 2B is a sectional view of the pneumatic tire 1 along line b-b' in FIG. 1.

As illustrated in FIG. 2A, the first auxiliary groove 51a is composed of: a first deep bottom portion 51d that is located in a center part of the first auxiliary groove 51a in the tire circumferential direction and has the largest groove depth from the tread surface 2 to the groove bottom; and a first shallow bottom portion 51e that gradually decreases in groove depth from the first deep bottom portion 51d to each of both sides in the tire circumferential direction while inclining from the first deep bottom portion to the tread surface 2 substantially in a straight line or a curved line.

As illustrated in FIG. 2B, the second auxiliary groove 52a is composed of: a second deep bottom portion 52e that has the largest groove depth; and a second shallow bottom portion 52d that is more central than the second deep bottom portion 52e in the tire circumferential direction and less in groove depth than the second deep bottom portion 52e and is located in a center part in the tire circumferential direction. The second shallow bottom portion 52d gradually decreases in groove depth so as to form a convex shape toward the tire radial inside, from the second deep bottom portion 52e to a part having the smallest groove depth, i.e. a part whose groove depth is about half that of the second deep bottom portion 52e.

Thus, in the second auxiliary groove 52a, the groove depth of the second shallow bottom portion 52d gradually decreases from the second deep bottom portion 52e so as to form a convex shape toward the tire radial inside. The groove part of such a second auxiliary groove 52a tends to remain even in the state where the tread has worn as a result of the use of the tire 1, as compared with the case where the groove depth gradually decreases so as to form a concave shape toward the tire radial inside. This reduces appearance degradation caused by wear.

At least a part of the external resonator 51 in the tire circumferential direction overlaps, in the tire width direction, with the external resonator 51 adjacent in the tire circumferential direction, and at least a part of the internal resonator 52 in the tire circumferential direction overlaps, in the tire width direction, with the internal resonator 52 adjacent in the tire circumferential direction, as illustrated in FIG. 1.

In detail, a part of the external resonator 51 on the one side in the tire circumferential direction, i.e. a part of the first auxiliary groove 51a on the one side in the tire circumferential direction and the second branch groove 51c in the illustrated example, overlaps in the tire width direction with a part of the first auxiliary groove 51a on the other side in the tire circumferential direction in the external resonator 51 adjacent on the one side in the tire circumferential direction. A part of the internal resonator 52 on the one side in the tire circumferential direction, i.e. a part of the second auxiliary groove 52a on the one side in the tire circumferential direction and the third branch groove 52b in the illustrated example, overlaps in the tire width direction with a part of the internal resonator 52 adjacent on the one side in the tire circumferential direction where the part is on the other side in the tire circumferential direction, i.e. the fourth branch groove 52c and a part of the second auxiliary groove 52a on the other side in the tire circumferential direction in the illustrated example.

In more detail, a part of the first auxiliary groove 51a on the one side in the tire circumferential direction in the external resonator 51 overlaps in the tire width direction with the first shallow bottom portion 51e of the first auxiliary groove 51a in the external resonator 51 adjacent in the tire circumferential direction, the first shallow bottom portion 51e being less in groove depth than the first deep bottom portion 51d having the largest groove depth.

At least a part of the second shallow bottom portion 52d in the internal resonator 52 overlaps in the tire width direction with the first deep bottom portion 51d in the corresponding external resonator 51.

In the internal intermediate land portion 42, sipes 6a and 6b extend respectively from the two internal circumferential main grooves 32a and 32b while inclining with respect to the tire width direction and terminate within the land portion, substantially at the center position of each second auxiliary groove 52a in the extension direction as illustrated in FIG. 1. In the drawing, the sipes 6a and 6b extend substantially in parallel with the third branch groove 52b and the fourth branch groove 52c. The term "sipe" means a groove having such a groove width that, when the tire 1 comes into contact with the ground, allows both groove walls to at least partially come into contact with each other and close the whole or part of the groove opening.

In the central land portion 43, first narrow grooves 71 each extend from the external circumferential main groove 31a over the tire equatorial plane CL while inclining with respect to the tire width direction and terminate in the land portion, as illustrated in FIG. 1. The first narrow groove 71 extends from the first branch groove 51b in the corresponding external resonator 51. Since the first narrow groove 71 terminates within the land portion, the central land portion 43 is a rib-shaped land portion continuously extending in the tire circumferential direction in the tire equatorial plane CL, both ends of which are not partitioned in the tire circumferential direction by grooves open to the external circumferential main groove 31a and the internal circumferential main groove 32a.

In the external shoulder land portion 44, a plurality of second narrow grooves 72 each of which extends in the tire width direction and is open to the tread ground contact edge TE and the external circumferential main groove 31b are spaced (equally spaced in the illustrated example) in the tread circumferential direction, as illustrated in FIG. 1. In addition, in the external shoulder land portion 44, a third narrow groove 73 extending from the tread ground contact edge TE inward in the tire width direction and terminating within the external shoulder land portion 44 is formed between each pair of second narrow grooves 72 adjacent in the tread circumferential direction. The external shoulder land portion 44 also has one fourth narrow groove 74 extending along the tire circumferential direction. In the illustrated example, the fourth narrow groove 74 is more inward in the tread width direction than the termination of the third narrow groove 73. These second narrow grooves 72, third narrow grooves 73, and fourth narrow groove 74 ensure edge components and maintain gripping performance.

In the internal shoulder land portion 45, a plurality of fifth narrow grooves 75 each of which extends in the tire width direction and is open to the tread ground contact edge TE and the internal circumferential main groove 32b are spaced (equally spaced in the illustrated example) in the tread circumferential direction, as illustrated in FIG. 1. In addition, in the internal shoulder land portion 45, a sixth narrow groove 76 extending from the tread ground contact edge TE inward in the tire width direction and terminating within the internal shoulder land portion 45 is formed between each pair of fifth narrow grooves 75 adjacent in the tire circumferential direction. The internal shoulder land portion 45 also has one seventh narrow groove 77 extending along the tire circumferential direction. In the illustrated example, the sixth narrow groove 76 terminates at its intersection with the seventh narrow groove 77. These fifth narrow grooves 75, sixth narrow grooves 76, and seventh narrow groove 77 ensure edge components and maintain gripping performance.

The following describes the working effects of the pneumatic tire 1 in this embodiment.

The tire 1 includes the external resonators 51 each having the branch grooves open to the external circumferential main grooves 31a and 31b, and the internal resonators 52 each having the branch grooves open to the internal circumferential main grooves 32a and 32b. This reduces air column resonance sound generated from both circumferential main grooves 3 which define the land portion having the resonators 51 or 52. Air column resonance sound generated from the four circumferential main grooves 3 formed in the tread surface 2 can thus be reduced.

A tire merely provided with resonators may have a smaller footprint area and lower rigidity and decrease in steering stability. In the tire 1, on the other hand, the central land portion 43 defined by the external circumferential main groove 31a and the internal circumferential main groove 32a adjacent to each other with the tire equatorial plane CL in between is a rib-shaped land portion continuous in the tire circumferential direction. Hence, the footprint area can be secured around the tire equatorial plane CL having the largest ground contact length in the tread footprint during straight running, and therefore steering stability and especially handling responsiveness (initial responsiveness in vehicle operation) can be ensured. Here, air column resonance sound generated from the circumferential main grooves 3 defining the central land portion 43 can be reduced by the external resonators 51 and internal resonators 52 open to the circumferential main grooves 3.

Moreover, the total groove width of the two external circumferential main grooves 31a and 31b is less than the total groove width of the two internal circumferential main grooves 32a and 32b. Accordingly, the footprint area of the vehicle-installed outside half portion OH is larger than in the case where they are equal in groove volume. By increasing the footprint area of the vehicle-installed outside half portion OH having the greater ground contact length during vehicle turning in this way, steering stability and especially turning performance can be improved.

Furthermore, the first auxiliary groove 51a in the external resonator 51 is less in groove volume than the second auxiliary groove 52a in the internal resonator 52. Hence, even when the total groove width of the two external circumferential main grooves 31a and 31b is less than the total groove width of the two internal circumferential main grooves 32a and 32b, the resonance frequency of each of the resonators 51 and 52 can be adapted to the air column resonance sound generated from the corresponding circumferential main groove 3, and so each of the resonators 51 and 52 can function sufficiently. This effectively reduces air column resonance sound.

Such a tire 1 achieves, at high level, both a reduction of air column resonance sound arising from the circumferential main grooves 3 and steering stability, that is, handling responsiveness and turning performance.

In addition, wet performance such as drainage performance can be maintained by the four circumferential main grooves 3 formed in the tread surface 2.

Preferably, the total groove width of the two external circumferential main grooves 31a and 31b is 0.5 times or more and less than 1.0 times the total groove width of the two internal circumferential main grooves 32a and 32b, to improve turning performance.

Preferably, in the tire 1, at least a part of each of the external resonators 51 in the tire circumferential direction overlaps, in the tire width direction, with an adjacent one of the external resonators 51 in the tire circumferential direction, and at least a part of each of the internal resonators 52 in the tire circumferential direction overlaps, in the tire width direction, with an adjacent one of the internal resonators 52 in the tire circumferential direction. With such a structure, in each land portion provided with the resonators 51 or 52, the rigidity difference in the tire circumferential direction between the high-rigidity part without the grooves of the resonators 51 or 52 and the low-rigidity part with the grooves of the resonators 51 or 52 is reduced. The rigidity in the tire circumferential direction can thus be made uniform to effectively improve uneven wear resistance and steering stability.

Preferably, the number of external resonators 51 is greater than the number of internal resonators 52, and at least a part of the first auxiliary groove 51a in each of the external resonators 51 in the tire circumferential direction overlaps, in the tire width direction, with the first shallow bottom portion 51e of the first auxiliary groove 51a in an adjacent one of the external resonators in the tire circumferential direction, the first shallow bottom portion 51e being less in groove depth than the first deep bottom portion 51d having the largest groove depth. Since the number of external resonators 51 is greater than the number of internal resonators 52, even when the first auxiliary groove 51a in the external resonator 51 is less in groove volume than the second auxiliary groove 52a in the internal resonator 52, air column resonance sound generated from the external circumferential main grooves 31a and 31b can be further reduced. Here, merely increasing the number of external resonators 51 has the possibility of causing a rigidity difference in the tire circumferential direction and affecting pattern noise. By overlapping, in the tire width direction, at least a part of the first auxiliary groove 51a in the external resonator 51 in the tire circumferential direction with the first shallow bottom portion 51e in the external resonator 51 adjacent in the tire circumferential direction, however, the rigidity difference in the tire circumferential direction is reduced in the external intermediate land portion 41. The rigidity in the tire circumferential direction can thus be made uniform to reduce pattern noise.

Preferably, the land portion width of each of the external intermediate land portion 41 and the internal intermediate land portion 42 is greater than the land portion width of the central land portion 43. With such a structure, the external intermediate land portion 41 provided with the resonators 51 and the internal intermediate land portion 42 provided with the resonators 52 each have a relatively large land portion width. This ensures the rigidity of each of these land portions even though provided with the resonators 51 or 52, and thus further improves steering stability. Although the central land portion 43 has a relatively small land portion width in this case, such a relatively small land portion width does not significantly affect steering stability because the central land portion 43 is a rib-shaped land portion.

Preferably, in each of the external resonators 51, the first branch groove 51b and the second branch groove 51c are each open to the first auxiliary groove 51a on one side in the tire circumferential direction, and in each of the internal resonators 52, the third branch groove 52b and the fourth branch groove 52c are respectively open to the second auxiliary groove 52a on the one side and the other side in the tire circumferential direction. With such a structure, the first branch groove 51b and the second branch groove 51c are each open to the first auxiliary groove 51a on the one side in the tire circumferential direction. Accordingly, the block-shaped portion formed between the grooves of the adjacent external resonators 51 is shorter in the tire circumferential direction than in the case where, for example, the first branch groove 51b and the second branch groove 51c are respectively open to the first auxiliary groove 51a on the one side and the other side in the tire circumferential direction. This increases the ground contact length during vehicle turning, and improves turning performance. Moreover, the third branch groove 52b and the fourth branch groove 52c are respectively open to the second auxiliary groove 52a on the one side and the other side in the tire circumferential direction. Accordingly, the block-shaped portion formed between the grooves of the adjacent internal resonators 52 is longer in the tire circumferential direction than in the case where, for example, the third branch groove 52b and the fourth branch groove 52c are each open to the second auxiliary groove 52a on the one side in the tire circumferential direction. This reduces the possibility of rattling noise occurring when the block-shaped portion comes into contact with the road surface. In the case where the block-shaped portion in the internal intermediate land portion 42 is short, the ground contact pressure of the internal intermediate land portion 42 tends to increase when, for example, the tire 1 is installed to a vehicle with a negative camber, and so there is the possibility of rattling noise occurring when the block-shaped portion comes into contact with the road surface.

Preferably, the second auxiliary groove 52a in each of the internal resonators 52 has the second shallow bottom portion 52d at least in a center part in the extension direction, and at least a part of the second shallow bottom portion 52d in the tire circumferential direction overlaps, in the tire width direction, with the first deep bottom portion 51d. With such a structure, given that the groove volume of the second auxiliary groove 52a in the internal resonator 52 is relatively large and so the rigidity of the land portion around the second auxiliary groove 52a may decrease, the second shallow bottom portion 52d with a small groove depth is formed at the center in the extension direction, thus ensuring rigidity. In addition, at least a part of the second shallow bottom portion 52d in the internal resonator 52 overlaps in the tire width direction with the first deep bottom portion 51d in the external resonator 51. This enhances the uniformity of the rigidity of the tread surface 2 in the tire width direction, too, and therefore effectively improves steering stability and uneven wear resistance.

Preferably, at the center position of the second auxiliary groove 52a in the extension direction in the internal intermediate land portion 42, the sipes 6a and 6b extend respectively from the internal circumferential main grooves 32a and 32b and terminate within the land portion. With such a structure, the rigidity of the block-shaped portion formed between the adjacent internal resonators 52 can be made uniform to reduce pattern noise.

While one of the disclosed embodiments has been described above with reference to drawings, the pneumatic tire according to the disclosure is not limited to the foregoing embodiment, and modifications may be made as appropriate. For example, although the external shoulder land portion and the internal shoulder land portion are provided with the second to seventh narrow grooves in the foregoing embodiment, the external shoulder land portion and the internal shoulder land portion may be provided with no such narrow grooves, provided with only part of the narrow grooves, or provided with more narrow grooves.

INDUSTRIAL APPLICABILITY

It is thus possible to provide a pneumatic tire that achieves, at high level, both a reduction of noise arising from circumferential main grooves and steering stability.

REFERENCE SIGNS LIST 1 pneumatic tire
2 tread surface
3 circumferential main groove
31a, 31b external circumferential main groove
32a, 32b internal circumferential main groove
41 external intermediate land portion
42 internal intermediate land portion
43 central land portion
44 external shoulder land portion
45 internal shoulder land portion
51 external resonator
52 internal resonator
51a first auxiliary groove
51b first branch groove
51c second branch groove
52a second auxiliary groove
52b third branch groove
52c fourth branch groove
51d first deep bottom portion
51e first shallow bottom portion
52d second shallow bottom portion
52e second deep bottom portion
6a, 6b sipe
71 first narrow groove
72 second narrow groove
73 third narrow groove
74 fourth narrow groove
75 fifth narrow groove
76 sixth narrow groove
77 seventh narrow groove
CL tire equatorial plane
OH vehicle-installed outside half portion
IH vehicle-installed inside half portion
TE tread ground contact edge

The invention claimed is:

1. A pneumatic tire comprising, in a tread surface:
two external circumferential main grooves extending in a tire circumferential direction, in a half portion positioned outside of a tire equatorial plane when the pneumatic tire is installed on a vehicle;
two internal circumferential main grooves extending in the tire circumferential direction, in a half portion positioned inside of the tire equatorial plane when the pneumatic tire is installed on a vehicle;
a central land portion defined by one of the external circumferential main grooves and one of the internal circumferential main grooves that are adjacent to each other with the tire equatorial plane in between;
an external intermediate land portion defined by the two external circumferential main grooves; and
an internal intermediate land portion defined by the two internal circumferential main grooves,
wherein the central land portion is a rib-shaped land portion continuous in the tire circumferential direction,
the external intermediate land portion includes external resonators each of which is composed of: a first auxiliary groove terminating within the external intermediate land portion at both ends; a first branch groove less in groove volume than the first auxiliary groove and having respective ends open to the external circumferential main groove closer to the tire equatorial plane and the first auxiliary groove; and a second branch groove less in groove volume than the first auxiliary groove and having respective ends open to the external circumferential main groove on the half portion positioned outside of the tire equatorial plane and the first auxiliary groove,
the internal intermediate land portion includes internal resonators each of which is composed of: a second auxiliary groove terminating within the internal intermediate land portion at both ends; a third branch groove less in groove volume than the second auxiliary groove and having respective ends open to the internal circumferential main groove closer to the tire equatorial plane and the second auxiliary groove; and a fourth branch groove less in groove volume than the second auxiliary groove and having respective ends open to the internal circumferential main groove on the half portion positioned inside of the tire equatorial plane and the second auxiliary groove,
the first auxiliary groove is less in groove volume than the second auxiliary groove,
a total groove width of the two external circumferential main grooves is less than a total groove width of the two internal circumferential main grooves,
the number of the external resonators is greater than the number of the internal resonators, and
at least a part of the first auxiliary groove in each of the external resonators in the tire circumferential direction overlaps, in a tire width direction, with a first shallow bottom portion of the first auxiliary groove in an adjacent one of the external resonators in the tire circumferential direction, the first shallow bottom portion being less in groove depth than a first deep bottom portion having a largest groove depth in the first auxiliary groove.

2. The pneumatic tire according to claim 1,
wherein at least a part of each of the external resonators in the tire circumferential direction overlaps, in a tire width direction, with an adjacent one of the external resonators in the tire circumferential direction, and at least a part of each of the internal resonators in the tire circumferential direction overlaps, in the tire width direction, with an adjacent one of the internal resonators in the tire circumferential direction.

3. The pneumatic tire according to claim 2,
wherein the number of the external resonators is greater than the number of the internal resonators, and
at least a part of the first auxiliary groove in each of the external resonators in the tire circumferential direction overlaps, in a tire width direction, with a first shallow bottom portion of the first auxiliary groove in an adjacent one of the external resonators in the tire circumferential direction, the first shallow bottom portion being less in groove depth than a first deep bottom portion having a largest groove depth in the first auxiliary groove.

4. The pneumatic tire according to claim 2,
wherein a land portion width of each of the external intermediate land portion and the internal intermediate land portion is greater than a land portion width of the central land portion.

5. The pneumatic tire according to claim 2,
wherein in each of the external resonators, the first branch groove and the second branch groove are each open to the first auxiliary groove on one side in the tire circumferential direction, and
in each of the internal resonators, the third branch groove and the fourth branch groove are respectively open to the second auxiliary groove on one side and the other side in the tire circumferential direction.

6. The pneumatic tire according to claim 2,
wherein the second auxiliary groove in each of the internal resonators has a second shallow bottom portion at least in a center part in an extension direction, the second shallow bottom portion being less in groove depth than a second deep bottom portion having a largest groove depth in the second auxiliary groove, and
at least a part of the second shallow bottom portion in the tire circumferential direction overlaps, in a tire width direction, with a first deep bottom portion having a largest groove depth in the first auxiliary groove.

7. The pneumatic tire according to claim 1,
wherein a land portion width of each of the external intermediate land portion and the internal intermediate land portion is greater than a land portion width of the central land portion.

8. The pneumatic tire according to claim 7,
wherein in each of the external resonators, the first branch groove and the second branch groove are each open to the first auxiliary groove on one side in the tire circumferential direction, and
in each of the internal resonators, the third branch groove and the fourth branch groove are respectively open to the second auxiliary groove on one side and the other side in the tire circumferential direction.

9. The pneumatic tire according to claim 7,
wherein the second auxiliary groove in each of the internal resonators has a second shallow bottom portion at least in a center part in an extension direction, the second shallow bottom portion being less in groove depth than a second deep bottom portion having a largest groove depth in the second auxiliary groove, and
at least a part of the second shallow bottom portion in the tire circumferential direction overlaps, in a tire width direction, with a first deep bottom portion having a largest groove depth in the first auxiliary groove.

10. The pneumatic tire according to claim 1,
wherein in each of the external resonators, the first branch groove and the second branch groove are each open to the first auxiliary groove on one side in the tire circumferential direction, and
in each of the internal resonators, the third branch groove and the fourth branch groove are respectively open to the second auxiliary groove on one side and the other side in the tire circumferential direction.

11. The pneumatic tire according to claim 10,
wherein the second auxiliary groove in each of the internal resonators has a second shallow bottom portion at least in a center part in an extension direction, the second shallow bottom portion being less in groove depth than a second deep bottom portion having a largest groove depth in the second auxiliary groove, and
at least a part of the second shallow bottom portion in the tire circumferential direction overlaps, in a tire width direction, with a first deep bottom portion having a largest groove depth in the first auxiliary groove.

12. The pneumatic tire according to claim 1,
wherein the second auxiliary groove in each of the internal resonators has a second shallow bottom portion at least in a center part in an extension direction, the second shallow bottom portion being less in groove depth than a second deep bottom portion having a largest groove depth in the second auxiliary groove, and
at least a part of the second shallow bottom portion in the tire circumferential direction overlaps, in a tire width direction, with a first deep bottom portion having a largest groove depth in the first auxiliary groove.

13. The pneumatic tire according to claim 1, wherein the first auxiliary groove in each of the external resonators is less in groove volume than each of the second auxiliary grooves.

* * * * *